(12) United States Patent
Shibata

(10) Patent No.: US 9,897,272 B2
(45) Date of Patent: Feb. 20, 2018

(54) VEHICLE LIGHTING DEVICE

(71) Applicant: KOITO MANUFACTURING CO., LTD., Tokyo (JP)

(72) Inventor: Hiroki Shibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/829,090

(22) Filed: Aug. 18, 2015

(65) Prior Publication Data

US 2016/0047519 A1   Feb. 18, 2016

(30) Foreign Application Priority Data

Aug. 18, 2014 (JP) .................. 2014-165980

(51) Int. Cl.
| | |
|---|---|
| *F21V 17/02* | (2006.01) |
| *F21S 8/10* | (2006.01) |
| *B60Q 1/00* | (2006.01) |
| *B60Q 1/20* | (2006.01) |
| *B60Q 1/068* | (2006.01) |

(52) U.S. Cl.
CPC ........ *F21S 48/1216* (2013.01); *B60Q 1/0094* (2013.01); *B60Q 1/0683* (2013.01); *B60Q 1/20* (2013.01); *F21S 48/1104* (2013.01); *F21S 48/1109* (2013.01); *F21S 48/1154* (2013.01); *F21S 48/1258* (2013.01); *F21S 48/1291* (2013.01); *F21S 48/1721* (2013.01); *F21S 48/328* (2013.01); *F21S 48/335* (2013.01)

(58) Field of Classification Search
CPC .... F21S 48/1216; F21S 48/1721; F21S 48/32; F21S 48/00; F21S 48/10; F21S 48/11; F21S 48/1104; F21S 48/1109; F21S 48/1145; F21S 48/115; F21S 48/1154; F21S 48/1163; F21S 48/1186; B60Q 1/0094
USPC ........................................................ 362/512
See application file for complete search history.

(56) References Cited

U.S. PATENT DOCUMENTS

| | | | | |
|---|---|---|---|---|
| 2012/0062117 A1* | 3/2012 | Tominaga | ............. | F21S 48/328 315/82 |
| 2012/0162983 A1* | 6/2012 | Pickholz | ................. | F21V 29/51 362/235 |
| 2012/0201042 A1* | 8/2012 | Shibata | ............... | F21S 48/1721 362/538 |

(Continued)

FOREIGN PATENT DOCUMENTS

JP   2011-108570 A   6/2011

*Primary Examiner* — Andrew Coughlin
*Assistant Examiner* — Michael Chiang
(74) *Attorney, Agent, or Firm* — Osha Liang LLP

(57) ABSTRACT

A vehicle lighting device includes a light source, a projection lens, a drive circuit board, and a housing. The light source includes a light emitting surface. The projection lens faces the light emitting surface and is disposed so that at least a part of light emitted from the light source passes through the projection lens. The drive circuit board includes a circuit to control switching of the light source on and off. The housing supports the light source and the drive circuit board and defines a part of a lamp chamber which houses the projection lens. A first direction that is a normal direction to the light emitting surface intersects a second direction that is a normal direction to a main surface of the drive circuit board.

9 Claims, 11 Drawing Sheets

(56) References Cited

U.S. PATENT DOCUMENTS

| | | | |
|---|---|---|---|
| 2013/0088151 A1* | 4/2013 | Dunn | H05B 33/0812 315/113 |
| 2014/0313762 A1* | 10/2014 | Owada | B60Q 1/0088 362/538 |
| 2014/0328079 A1* | 11/2014 | Itagaki | F21V 29/02 362/547 |

* cited by examiner

VEHICLE LIGHTING DEVICE

CROSS REFERENCE TO RELATED APPLICATION(S)

This application is based on and claims priority under 35 U.S.C. § 119 to Japanese Patent Application No. 2014-165980 filed on Aug. 18, 2014, the entire contents of which are incorporated herein by reference.

BACKGROUND

Field

Exemplary embodiments of the invention relate to a vehicle lighting device.

Related Art

Fog lamps, in which a light source and a projection lens are housed in a lamp chamber defined by a housing and a transparent cover, have been known as an example of a vehicle lighting device. Light emitted from the light source undergoes specific directional control upon passing through the projection lens, and forms a specific light distribution pattern ahead of a vehicle (see, for example, JP 2011-108570 A).

SUMMARY

Some of exemplary embodiments the invention address a demand to further reduce a size of a vehicle lighting device.

(1) According to one exemplary embodiment, a vehicle lighting device includes a light source, a projection lens, a drive circuit board, and a housing. The light source includes a light emitting surface. The projection lens faces the light emitting surface and is disposed so that at least a part of light emitted from the light source passes through the projection lens. The drive circuit board includes a circuit to control switching of the light source on and off. The housing supports the light source and the drive circuit board and defines a part of a lamp chamber which houses the projection lens. A first direction that is a normal direction to the light emitting surface intersects a second direction that is a normal direction to a main surface of the drive circuit board.

Since the drive circuit board is disposed in the above described manner, a projected area of the lighting device on a plane orthogonal to the normal direction of the light emitting surface can be made smaller than the case where the normal direction of the main surface of the drive circuit board coincides with the normal direction of the light emitting surface of the light source. The magnitude of the surface area gives a particularly strong impression on an observer. Generally, it is strongly demanded to reduce this projected area. With the above-described configuration, such a demand for the vehicle lighting device can be met.

(2) In the lighting device of (1), the first direction may be orthogonal to the second direction.

(3) In the lighting device of any one of (1) to (2), the housing may include an attachment portion to which a transparent cover is attached. The transparent cover and the housing may define the lamp chamber. The attachment portion may obliquely cut across the main surface of the drive circuit board when viewed along the second direction.

Generally, a portion of the vehicle to which the fog lamp 1 is fixed is configured by a surface that obliquely extends when viewed along the up and down directions of the vehicle. The attachment portion of the transparent cover is configured to have a shape that obliquely cuts across the main surface of the drive circuit board. Thereby, the lamp chamber 4 can be formed to have a shape conforming to the obliquely extending surface, and drop in aerodynamic performance can be suppressed. Moreover, there remains a portion of the drive circuit board though which it is easy to access the main surface. This portion can be utilized in placing components to fix the drive circuit board to the support table of the housing. Therefore, while the demand to reduce the size of the vehicle lighting device is met, efficiency of work to attach the drive circuit board is not deteriorated.

(4) In the lighting device of any one of (1) to (3), the housing may be a single metal member that is integrally molded with a plurality of radiator plates. The housing may be formed with a ventilation portion that is in communication with the lamp chamber.

With this configuration, the housing, which defines a part of the lamp chamber, can also serve as a heat sink. This configuration can reduce the size of the entire lighting device as compared with the configuration in which a housing, being made from a resin or the like and defining a part of a lamp chamber, is provided in addition to a heat sink. Therefore, the above-described configuration can meet a demand to further reduce a size of the vehicle lighting device.

In order to dehumidify inside of the lamp chamber, the ventilation portion is provided in the housing that serves as a heat sink. Therefore, condensation associated with drop in temperature in the lamp chamber occurs on the housing first, which decreases the need to perform anti-fogging treatment on the projection lens and the transparent cover. Accordingly, the above-described configuration can meet not only a demand to reduce a size of the vehicle lighting device, but also a demand to suppress costs.

(5) The lighting device of any one of (1) to (3) may further include a ventilation cap. The housing may be formed with a ventilation portion that is in communication with the lamp chamber and that defines an airflow passage opening to an opposite side of the housing to the lamp chamber. The ventilation cap covers the ventilation portion.

(6) The lighting device of any one of (1) to (5) may further include a holder, a pivot shaft, a shaft bearing, and an aiming mechanism. The holder holds the projection lens. A position of the holder is fixed with respect to the light source. The pivot shaft is provided in one of the projection lens and the holder and extends in a direction intersecting the optical axis of the projection lens. The shaft bearing is provided in the other of the projection lens and the holder and holds the pivot shaft. The aiming mechanism rotates the projection lens about the pivot shaft with respect to the holder.

With this configuration, the projection lens, which is held by the holder, can be rotated directly to adjust a reference position of the optical axis of the projection lens. Thereby, the demand to reduce the size of the vehicle lighting device is mat while the projection lens and the aiming mechanism to adjust the optical axis thereof can be provided.

(7) In the lighting device of (6), the aiming mechanism may include a screw and a joint. The screw may include a portion that can be operated at an outside of the housing so as to rotate. The joint may convert rotation of the screw into a force to rotate the projection lens about the pivot shaft. The screw may extend to pass through a portion of the housing. The main surface of the drive circuit board may face a portion of the screw.

With this configuration, a space required to provide the aiming screw can be efficiently utilized, while an increase in size of the housing can be suppressed. Therefore, the demand to reduce the size of the vehicle lighting device is met while the projection lens and the aiming mechanism to adjust the optical axis thereof can be provided.

(8) In the lighting device of (7), the joint may be integrated with the projection lens.

With this configuration, the number of components can be reduced while the demand to reduce the size of the vehicle lighting device is met. In the case where the lens and the joint are provided to be separatable from each other, it is facilitated to mold the individual members.

(9) In the lighting device of any one of (7) to (8), the housing may include a contour portion having a circular shape when viewed along the first direction. A passage and a ventilation portion may be formed in the housing. A power supply line to supply power to the circuit may pass through the passage. The ventilation portion may be in communication with the lamp chamber. The screw may extend to pass through the housing between the passage and the ventilation portion.

The housing includes the contour portion having the circular shape when viewed along the normal direction of the light emitting surface of the light source. Therefore, the projected area of the vehicle lighting device on a plane orthogonal to the normal direction can be made small. In the case where the housing has such a shape, it is relatively easy to ensure a space, in which components are disposed, near a central portion thereof. The aiming screw having a relatively large dimension is disposed between the through hole and the ventilation portion, which have relatively small dimensions. Thereby, the aiming screw can be effectively disposed near the central portion of the housing. Accordingly, the demand to reduce the size of the vehicle lighting device is met while the projection lens and the aiming mechanism to adjust the optical axis thereof can be provided.

DETAILED DESCRIPTION

Figure 1:
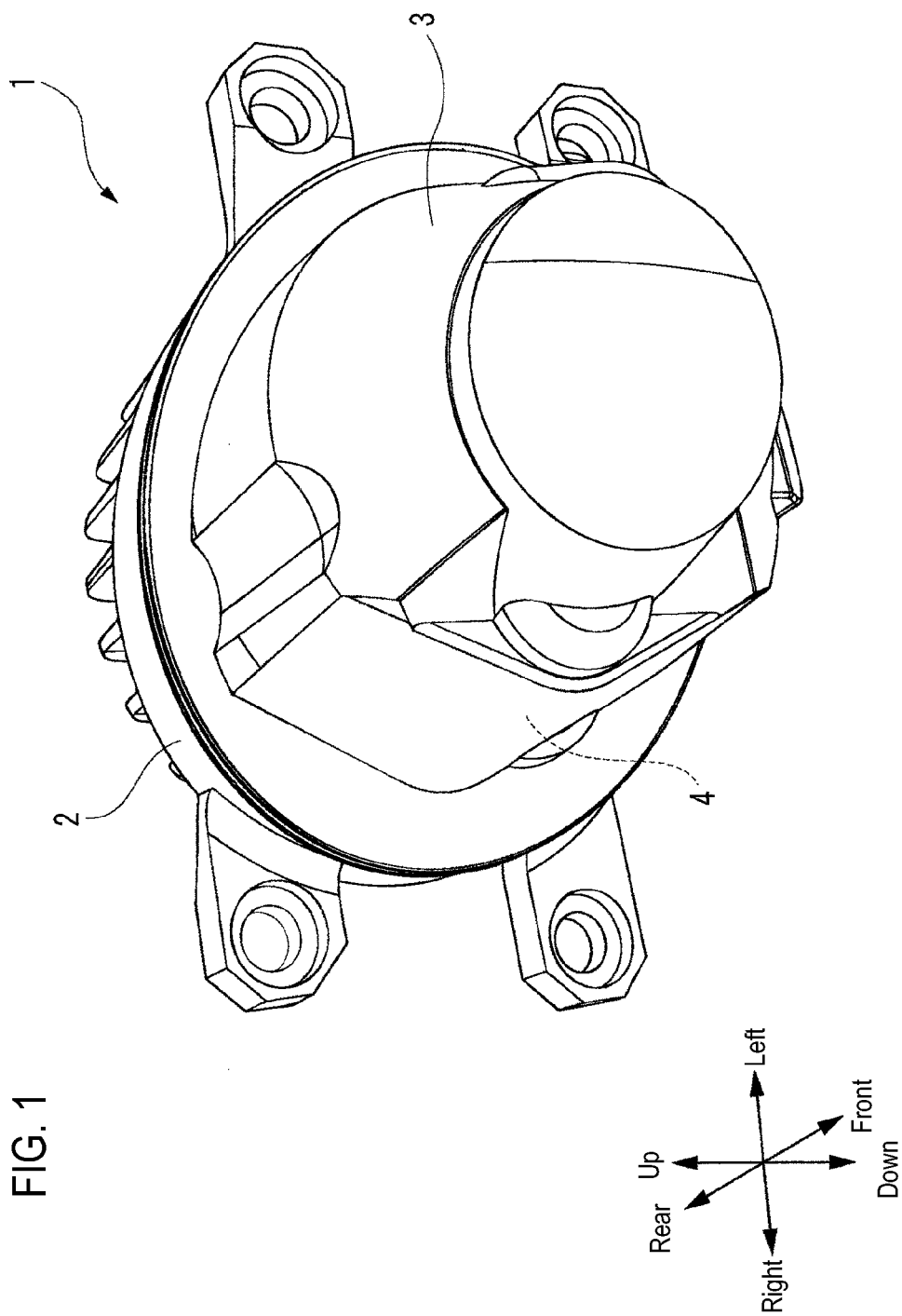
FIG. 1 is a perspective view illustrating a fog lamp according to an exemplary embodiment.

Detailed description will be given on exemplary embodiments of the invention with reference to the accompanying drawings. In the drawings which will be referred to in the description, scale is adjusted appropriately so that respective elements are large enough to be recognizable. Also, "right" and "left" in the description will indicate left and right directions when viewed from a driving seat of a vehicle.

FIG. 1 is a perspective view illustrating an external appearance of a fog lamp 1 (an example of a lighting device) according to the exemplary embodiment of the invention, when viewed from the upper front right. The fog lamp 1 shown in FIG. 1 is to be mounted in a right front portion of a vehicle. A fog lamp to be mounted in a left front portion of the vehicle has a bilaterally symmetrical shape to the fog lamp 1 shown in FIG. 1.

The fog lamp 1 includes a housing 2 and a transparent cover 3. The transparent cover 3 is attached to the housing 2 to define a lamp chamber 4.

Figure 2:
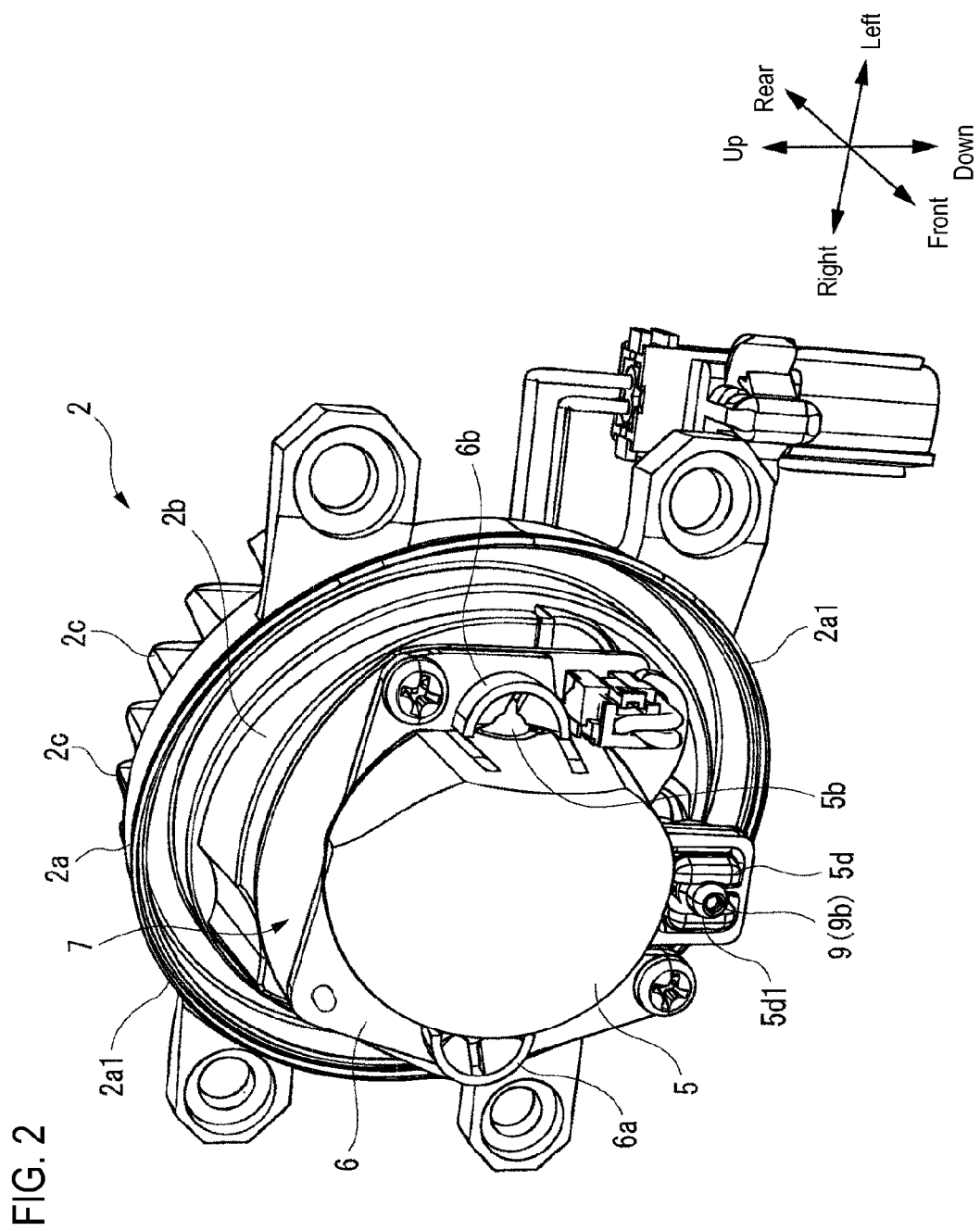
FIG. 2 is a perspective view partially illustrating the fog lamp of FIG. 1.

FIG. 2 is a perspective view partially illustrating the fog lamp 1 with the transparent cover 3 being removed, when viewed from the upper front left. The housing 2 includes a back plate 2a, a support table 2b, and plural radiator plates 2c. A peripheral edge portion of a front surface of the back plate 2a makes up an attachment portion 2a1 to which the transparent cover 3 is attached. The support table 2b is provided in front of the back plate 2a, and is housed in the lamp chamber 4. The plural radiator plates 2c are provided at a rear surface of the back plate 2a, and extend along upper and lower directions. That is, the plural radiator plates 2c are disposed outside the lamp chamber 4.

The fog lamp 1 includes a projection lens 5, a lens holder 6, and a light source unit 7. The projection lens 5, the lens holder 6, and the light source unit 7 are housed in the lamp chamber 4.

Figure 3:
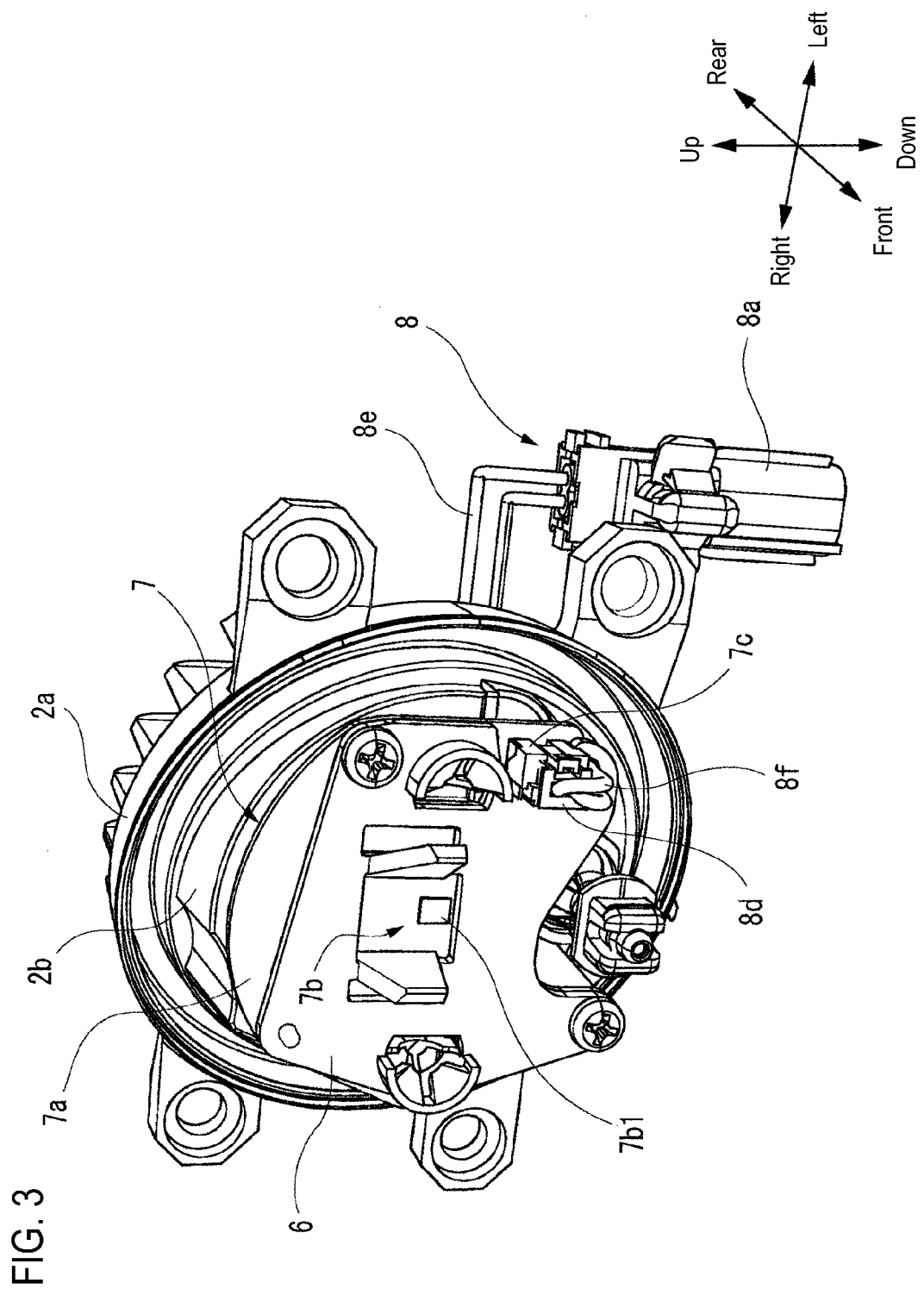
FIG. 3 is a perspective view partially illustrating the fog lamp of FIG. 1.

FIG. 3 is a perspective view partially illustrating the fog lamp 1 when viewed from the upper front left, in which the projection lens 5 has been removed from the state shown in FIG. 2. The light source unit 7 includes a support board 7a, a light source 7b, and a first connector 7c. The support board 7a is mounted on a front surface of the support table 2b of the housing 2. The light source 7b and the first connector 7c are disposed on a front surface of the support board 7a. A circuit wiring (not shown) is formed on the support board 7a, and electrically connects the light source 7b and the first connector 7c to each other.

In this exemplary embodiment, the light source 7b includes a semiconductor light emitting element having a light emitting surface 7b1. Examples of the semiconductor light emitting element include a light emitting diode, a laser diode, and an organic EL element. The number of light emitting elements is not specifically limited, but may be set appropriately according to specifications of the vehicle lighting device.

Figure 4:
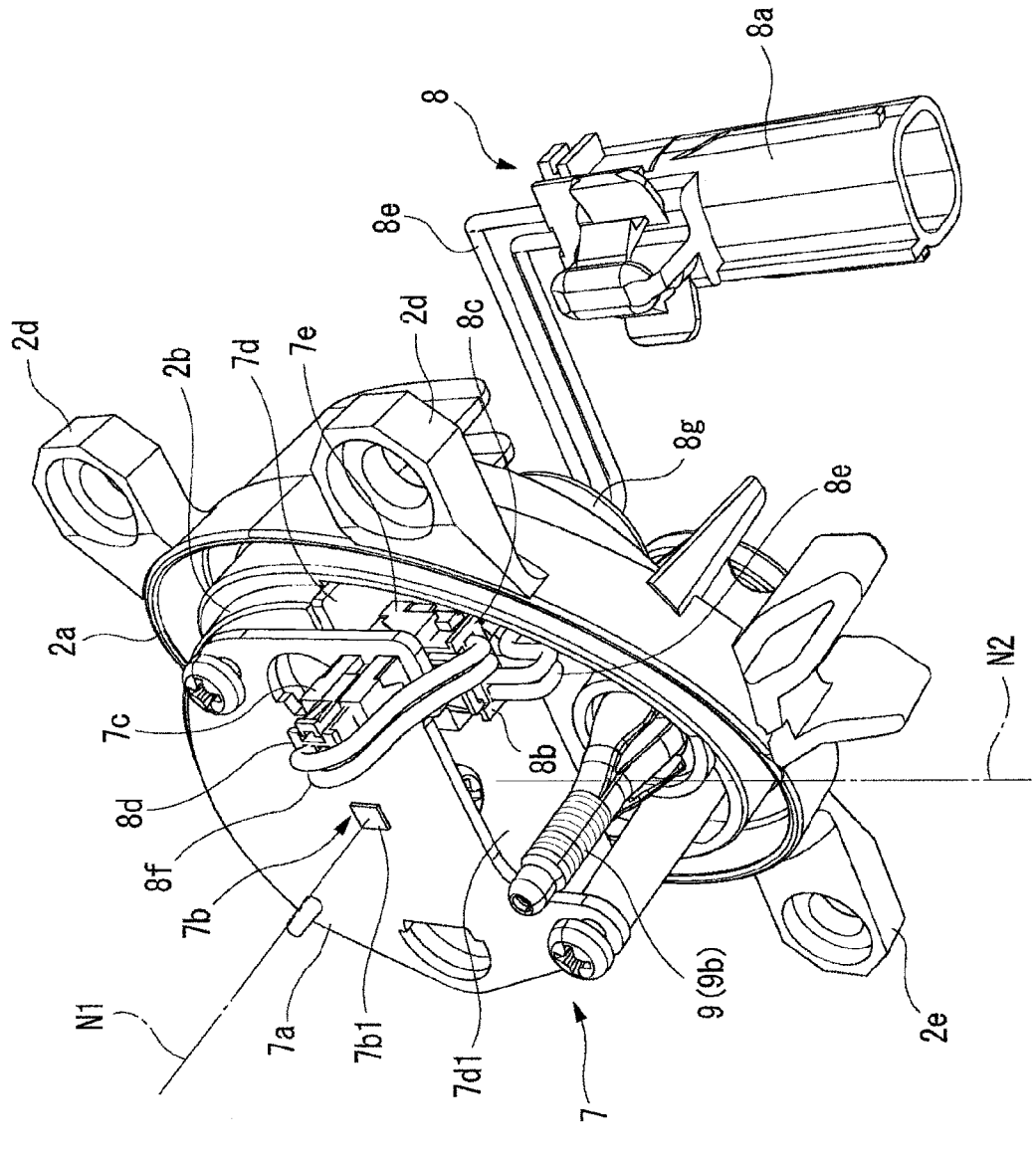
FIG. 4 is a perspective view partially illustrating the fog lamp of FIG. 1.
Figure 4:
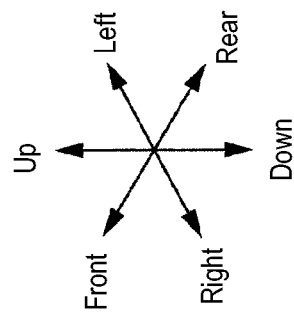
Figure 5:
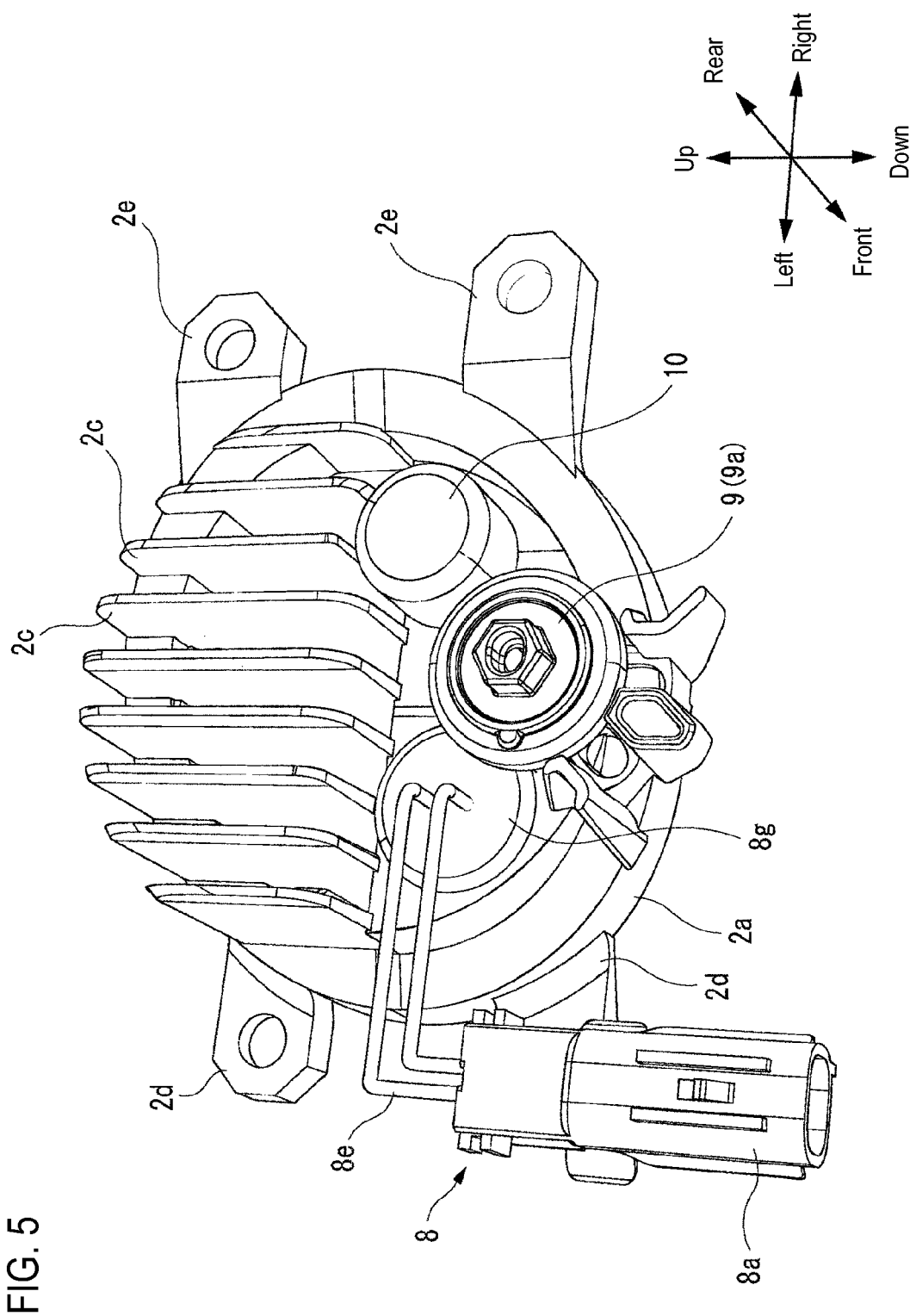
FIG. 5 is a perspective view partially illustrating the fog lamp of FIG. 1.

FIG. 4 is a perspective view partially illustrating the fog lamp 1 when viewed from the lower front left, in which the lens holder 6 has been removed from the state shown in FIG. 3. FIG. 5 is a perspective view illustrating the same state as FIG. 4, when viewed from the lower rear left. The light source unit 7 further includes a drive circuit board 7d and a second connector 7e.

The drive circuit board 7d includes a light source drive circuit that controls switching of the light source 7b on and off. The second connector 7e is electrically connected to the light source drive circuit. The drive circuit board 7d is mounted to a lower face of the support table 2b of the housing 2.

As shown in FIGS. 4 and 5, the fog lamp 1 includes a wiring unit 8. The wiring unit 8 includes an external connector 8a, a first internal connector 8b, a second internal connector 8c, a third internal connector 8d, a first connection wire 8e, a second connection wire 8f, and a sealing member 8g.

The external connector 8a is disposed outside the lamp chamber 4. The external connector 8a is configured to be connectable to a counterpart connector (not shown) that is connected to a power source or an integrated controller. The power source and/or the integrated controller are mounted in the vehicle provided with the fog lamp 1. The counterpart connector is connected the power source or the integrated controller so that (i) power can be supplied between the counterpart connector and the power source or the integrated controller or (ii) communication can be made between the counterpart connector and the power source or the integrated controller. The first internal connector 8b is connected through the first connection wire 8e to the external connector 8a so that the first internal connector 8b can communicate with the external connector 8a. The first internal connector 8b is connected to the second connector 7e provided in the drive circuit board 7d. Power supplied from the power source or a control signal transmitted from the integrated controller is input to the light source drive circuit provided in the drive circuit board 7d through the external connector 8a, the first internal connector 8b, and the second connector 7e.

The first connection wire 8e extends to pass through the sealing member 8g. The sealing member 8g is fitted to a through hole formed in the back plate 2a. The through hole is formed below the support table 2b and the plural radiator plates 2c.

The second internal connector 8c and the third internal connector 8d are connected to each other through the second connection wire 8f so that (i) power can be supplied therebetween or (ii) communication can be made therebetween. The second internal connector 8c is connected to the second connector 7e provided in the drive circuit board 7d. As shown in FIG. 3, the third internal connector 8d is connected to the first connector 7c provided in the support board 7a. A control signal output from the light source drive circuit of the drive circuit board 7d is input to the light source 7b through the second internal connector 8c, the third internal connector 8d, and the first connector 7c. Thereby, the light source 7b is switched on and off as desired.

As shown in FIG. 4, in this exemplary embodiment, a normal direction N1 (an example of a first direction) to the light emitting surface 7b1 of the light source 7b is orthogonal to a normal direction N2 (an example of a second direction) to a main surface 7d1 of the drive circuit board 7d. It is noted that the term "main surface" refers to a surface having the largest area among surfaces making up the drive circuit board 7d.

Since the drive circuit board 7d is arranged in this manner, at least one of (i) a dimension of the fog lamp 1 in the up and down directions and (ii) a dimension of the fog lamp 1 in the right and left directions dimension can be made small as compared with the configuration in which a main surface of a drive circuit board coincides with a normal direction to a light emitting surface of a light source (that is, the main surface faces the front or rear direction). In other words, when viewed from the front side of the fog lamp 1, a projected area of the fog lamp 1 on a plane including the up and down directions and the right and left directions can be made small. The magnitude of the projected area gives a particularly strong impression on an observer. Generally, it is strongly demanded to reduce this projected area. With the above-described configuration, such a demand for a fog lamp which is an example of a vehicle lighting device can be met.

Figure 6:
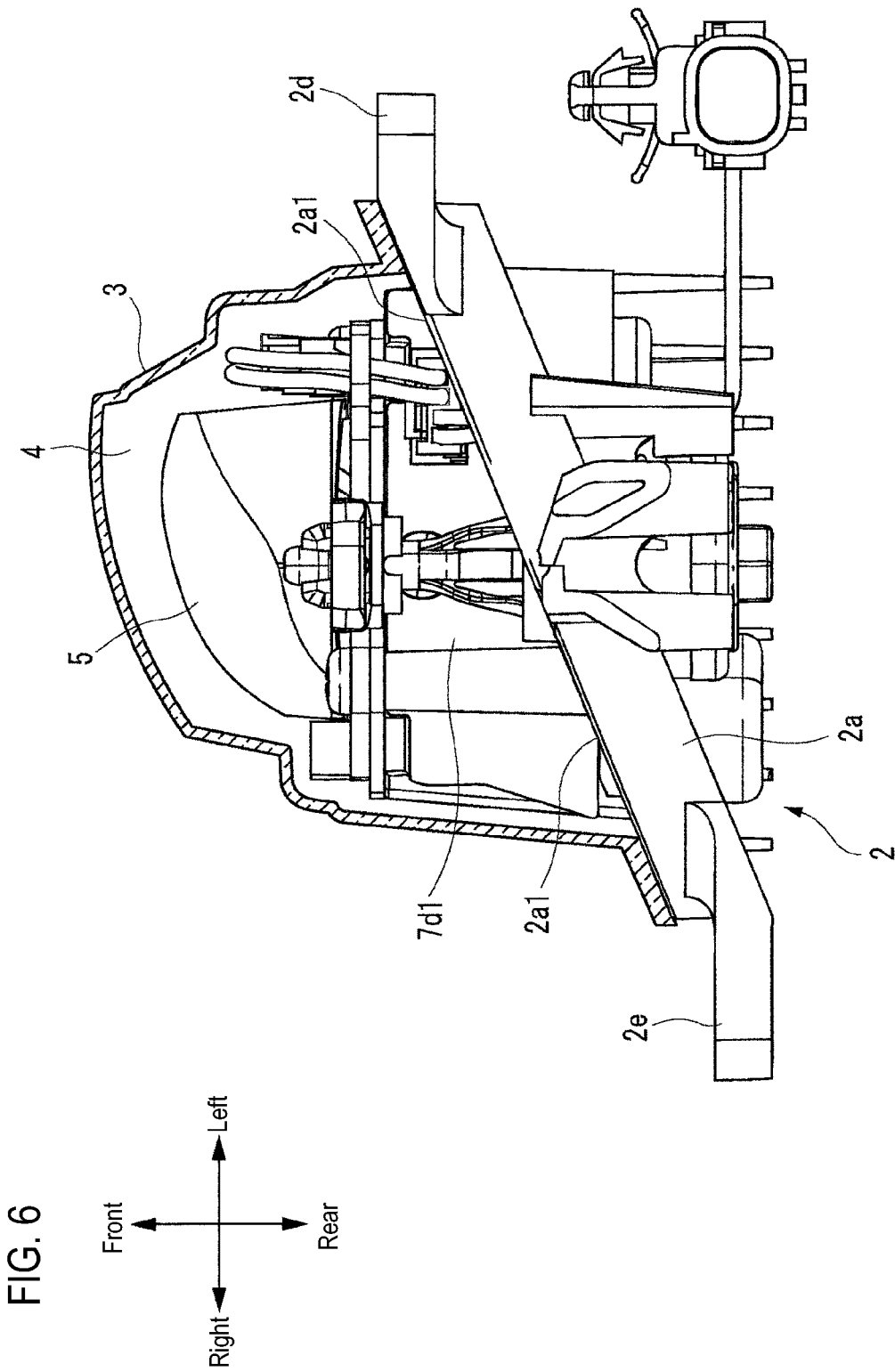
FIG. 6 is a bottom view of the fog lamp of FIG. 1, a part of the bottom view being a section view.

FIG. 6 shows the fog lamp 1 when viewed from below with the transparent cover 3 alone being drawn cross-sectionally. As described above, the housing 2 includes the attachment portion 2a1 to which the transparent cover 3 is attached. The transparent cover 3 and the housing 2 define the lamp chamber 4 together with the housing 2. When viewed along the normal direction N2 of the main surface 7d1 of the drive circuit board 7d, the attachment portion 2a1 obliquely cuts across the main surface 7d1.

Generally, a portion of the vehicle to which the fog lamp 1 is fixed is configured by a surface that obliquely extends when viewed along the up and down directions of the vehicle. The attachment portion 2a1 of the transparent cover 3 is configured to have a shape that obliquely cuts across the main surface 7d1 of the drive circuit board 7d as described above. Thereby, the lamp chamber 4 can be formed to have a shape conforming to the obliquely extending surface. Moreover, there remains a portion of the drive circuit board 7d through which it is easy to access the main surface 7d1. This portion can be utilized in placing components to fix the drive circuit board 7d to the support table 2b of the housing 2, Therefore, while a demand to reduce a size of a fog lamp which is an example of a vehicle lighting device is met, efficiency of work to attach the drive circuit board 7d is not deteriorated.

As shown in FIGS. 4 and 5, the housing 2 includes a pair of left attachment portions 2d and a pair of right attachment portions 2e. The left attachment portions 2d are provided on a left end portion of the attachment portion 2a1 so as to be arranged in the up and down directions and to extend to the left. The right attachment portions 2e are provided on a right end portion of the attachment portion 2a1 so as to be arranged in the up and down directions and to extend to the right. As shown in FIG. 6, the pair of left attachment portions 2d is disposed on a front side of the pair of right attachment portions 2e. The left attachment portions 2d and the right attachment portions 2e are respectively formed with through holes that open in the front and rear directions of the fog lamp 1. Each through hole allows a fastening member to pass therethrough. The fastening members are used to fix the fog lamp 1 to predetermined portions on the vehicle.

Figure 7:
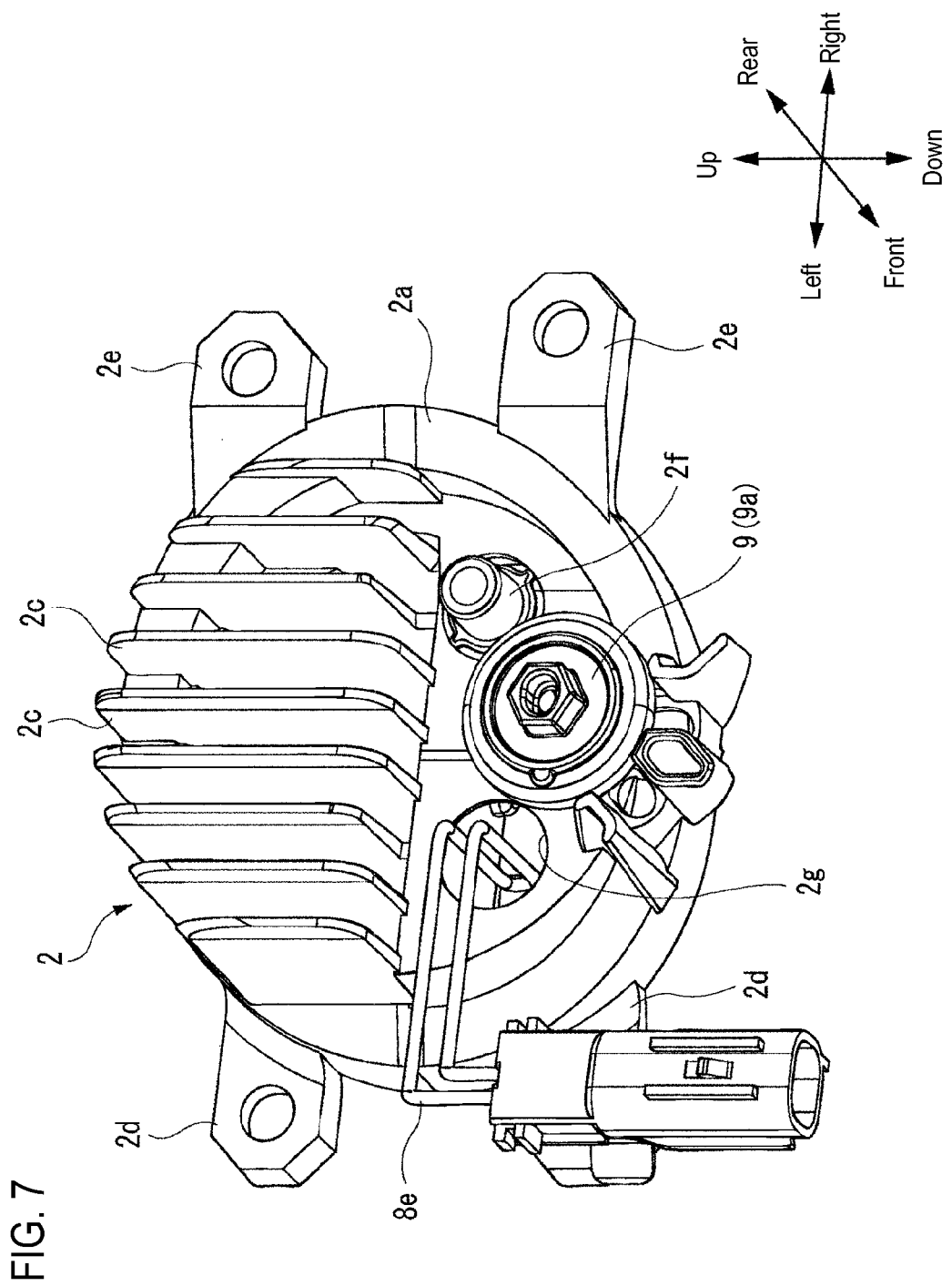
FIG. 7 is a perspective view partially illustrating the fog lamp of FIG. 1.

As shown in FIG. 5, a ventilation cap 10 is attached to a rear surface of the housing 2. FIG. 7 is a perspective view partially illustrating the fog lamp 1 when viewed from the lower rear left, with the ventilation cap 10 and the sealing member 8g of the wiring unit 8 being removed from the state shown in FIG. 5. The housing 2 includes a ventilation portion 2f. The ventilation portion 2f is in communication with the lamp chamber 4, and constitutes an airflow passage opening to the rear side of the housing 2. The ventilation cap 10 is attached to the housing 2 so as to cover the ventilation portion 2f. Water and dust is thereby prevented from entering the lamp chamber 4 through the ventilation portion 2f.

In this exemplary embodiment, the back plate 2a, the support table 2b (see FIG. 3), the plural radiator plates 2c, the pair of left attachment portions 2d, the pair of right attachment portions 2e, and the ventilation portion 2f are parts of a single, integrally molded, metal member. That is, while defining a part of the lamp chamber 4, the housing 2 serves as a heat sink.

This configuration can reduce the size of the entire fog lamp 1 as compared with the configuration in which a housing, being made from a resin or the like and defining a part of a lamp chamber, is provided in addition to a heat sink.

Therefore, the above-described configuration can meet a demand to further reduce a size of the fog lamp 1 which is an example of a vehicle lighting device.

The ventilation portion 2f is formed in order to dehumidify inside of lamp chamber 4. That is, the ventilation portion 2f is provided in order to suppress condensation due to temperature changes in the lamp chamber 4 caused by switching the light source 7b on and off. In this exemplary embodiment, the ventilation portion 2f is provided in the housing 2 serving as a heat sink. Therefore, condensation associated with drop in temperature in the lamp chamber 4 occurs on the housing 2 first, which decreases the need to perform anti-fogging treatment on the projection lens 5 and the transparent cover 3. Accordingly, the above configuration can meet not only a demand to reduce a size of the vehicle lighting device, but also a demand to suppress costs.

As shown in FIG. 3, the lens holder 6 is fixed to the front surface of the support board 7a. As shown in FIG. 2, the lens holder 6 holds the projection lens 5. At least a part of the light emitted from the light source 7b passes through the projection lens 5. The light which has passed through the projection lens 5 then passes through the transparent cover 3 and illuminates ahead of the fog lamp 1.

Figure 8:
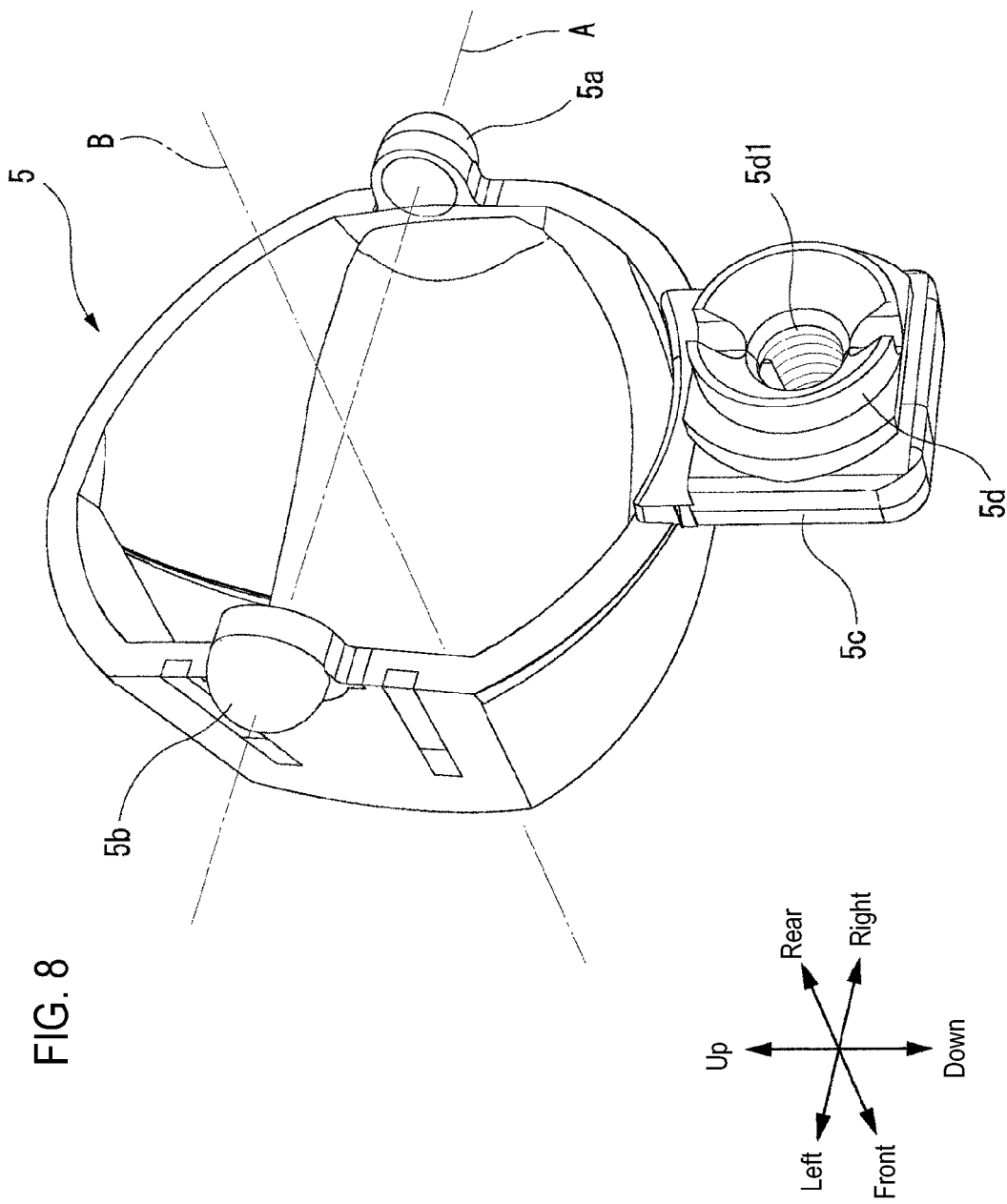
FIG. 8 is a perspective view illustrating a projection lens provided in the fog lamp of FIG. 1.
Figure 9:
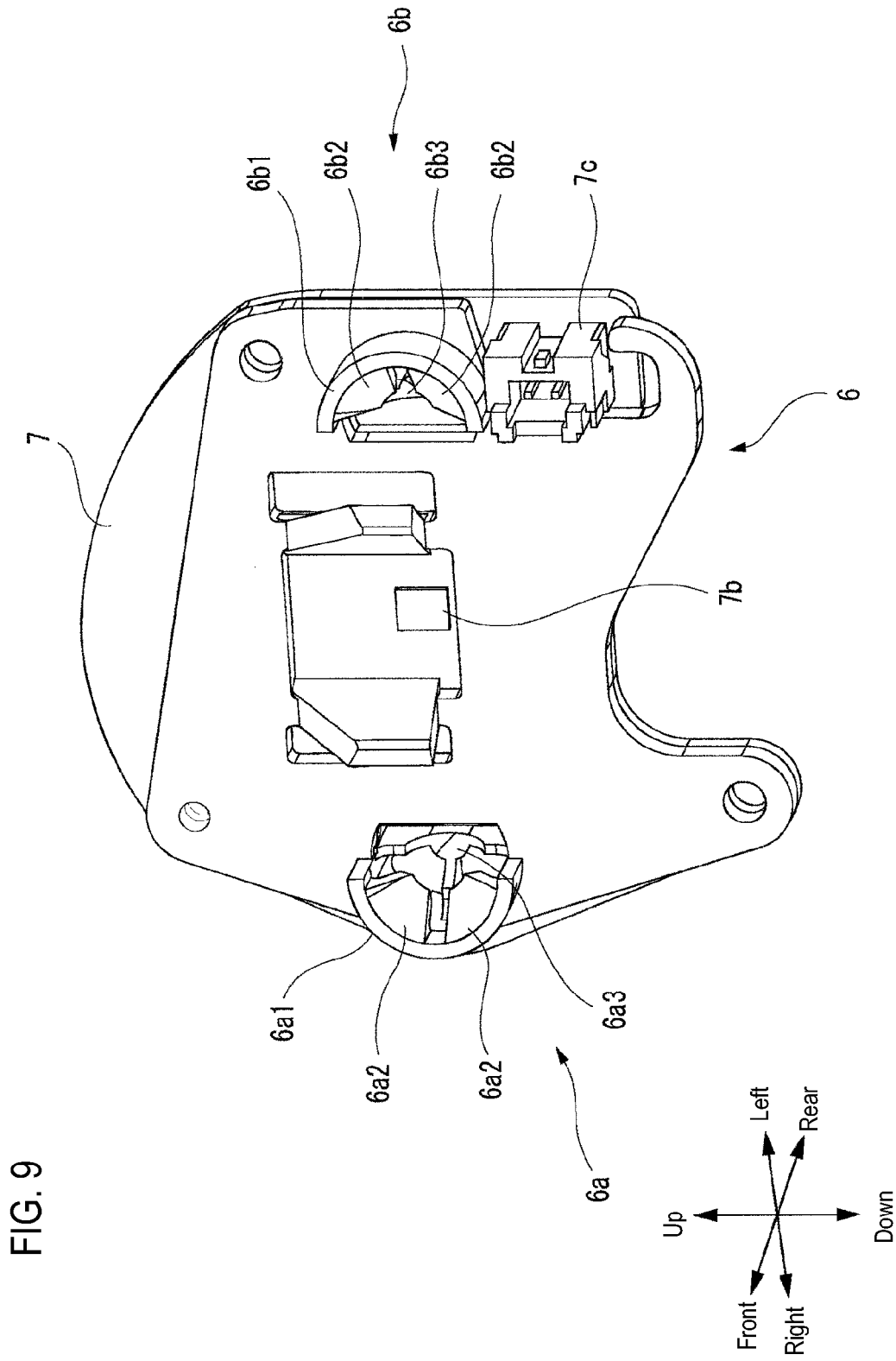
FIG. 9 is a perspective view illustrating a lens holder provided in the fog lamp of FIG. 1.

Next, the structure by which the lens holder 6 holds the projection lens 5 will be described with reference to FIGS. 8 and 9. FIG. 8 is a perspective view illustrating an external view of the projection lens 5 when the projection lens 5 is viewed from the lower rear left. FIG. 9 is a perspective view illustrating an external view of the lens holder 6 attached to the light source unit 7 when the lens holder 6 is viewed from the lower front left.

As shown in FIG. 8, the projection lens 5 includes a right pivot shaft 5a and a left pivot shaft 5b. The right pivot shaft 5a is disposed at a right side portion of the projection lens 5. The right pivot shaft 5a is formed in a semispherical shape. A spherical surface of the right pivot shaft 5a faces toward the right. The left pivot shaft 5b is disposed at a left side portion of the projection lens 5. The left pivot shaft 5b is formed in a semispherical shape. A sphere surface of the left pivot shaft 5b faces toward the left. An axis "A" connecting a center of the right pivot shaft 5a and a center of the left pivot shaft 5b extends in a direction orthogonal to an optical axis B of the projection lens 5.

As shown in FIG. 9, the lens holder 6 includes a right shaft bearing 6a and a left shaft bearing 6b. The right shaft bearing 6a and the left shaft bearing 6b are provided on a front surface of the lens holder 6.

The right shaft bearing 6a includes a peripheral wall 6a1, a pair of protrusions 6a2, and a curved bearing surface 6a3. The peripheral wall 6a1 protrudes forward from the front surface of the lens holder 6, and extends in a semicircular arc shape. The semicircular arc of the peripheral wall 6a1 is open toward the left. Each protrusion 6a2 extends from a front end portion of the peripheral wall 6a1 toward the inside of the semicircular arc so as to overhang. Each protrusion 6a2 can flexibly deform toward the rear to some extent. The curved bearing surface 6a3 is disposed at the inside of the semicircular arc of the peripheral wall 6a1, and faces the pair of protrusions 6a2. The curved bearing surface 6a3 has a shape conforming to the semispherical surface of the right pivot shaft 5a.

The left shaft bearing 6b includes a peripheral wall 6b1, a pair of protrusions 6b2, and a curved bearing surface 6b3. The peripheral wall 6b1 protrudes forward from the front surface of the lens holder 6, and extends in a semicircular arc shape. The semicircular arc of the peripheral wall 6b1 is open toward the right. Each protrusion 6b2 extends from a front end portion of the peripheral wall 6b1 toward the inside of the semicircular arc, so as to overhang. Each protrusion 6b2 can flexibly deform toward the rear to some extent. The curved bearing surface 6b3 is disposed at the inside of the semicircular arc of the peripheral wall 6b1, and faces the pair of protrusions 6b2. Although hidden by the pair of protrusions 6b2 in FIG. 9, the curved bearing surface 6b3 is symmetric in the right and left directions to the curved bearing surface 6a3 and has a shape conforming to the semispherical surface of the left pivot shaft 5b.

The projection lens 5 and the lens holder 6 which have the above configuration are joined together as shown in FIG. 2. When the projection lens 5 and the lens holder 6 are joined together, the right shaft bearing 6a and the left shaft bearing 6b of the lens holder 6 hold the right pivot shaft 5a and the left pivot shaft 5b of the projection lens 5, respectively.

Specifically, the right pivot shaft 5a is pressed against the right shaft bearing 6a, so that the right pivot shaft 5a enters a region enclosed by the peripheral wall 6a1 while deforming the pair of protrusions 6a2 toward the rear. When a portion of the semispherical surface of the right pivot shaft 5a contacts the curved bearing surface 6a3, the pair of protrusions 6a2 returns to its original position to thereby prevent the right pivot shaft 5a from coming out forward. Accordingly, the right pivot shaft 5a can pivot in the region enclosed by the peripheral wall 6a1 and in a plane orthogonal to the axis "A" shown in FIG. 8.

Similarly, the left pivot shaft 5b is pressed against the left shaft bearing 6b, so that the left pivot shaft 5b enters a region enclosed by the peripheral wall 6b1 while deforming the pair of protrusions 6b2 rearward. When a portion of the semispherical surface of the left pivot shaft 5b contacts the curved bearing surface 6b3, the pair of protrusions 6b2 returns to its original position to thereby prevent the left pivot shaft 5b from coming out forward. Accordingly, the left pivot shaft 5b can pivot in the region enclosed by the peripheral wall 6b1 and in a plane orthogonal to the axis "A" shown in FIG. 8.

As shown in FIGS. 4 and 5, the fog lamp 1 includes an aiming screw 9. The aiming screw 9 includes a head 9a and a shaft 9b. As shown in FIG. 5, the head 9a is disposed below the plural radiator plates 2c and on the rear surface of the back plate 2a of the housing 2. That is, the head 9a is disposed outside the housing 2. The head 9a can be operated and rotated by a specific tool. The shaft 9b passes through the back plate 2a and extends inside the lamp chamber 4. An outer peripheral surface of the shaft 9b is formed with a thread groove.

As shown in FIG. 8, the projection lens 5 includes a coupling portion 5c and a joint 5d. The coupling portion 5c is integrally molded to a lower portion of the projection lens 5 and extends downward from the lower portion. The joint 5d is attached to the coupling portion 5c. A through hole 5d1 is formed in the joint 5d. A thread groove is formed in an inner peripheral surface of the through hole 5d1.

As shown in FIG. 2, the shaft 9b of the aiming screw 9 is inserted into the through hole 5d1 of the joint 5d. At this time, the thread groove formed in the outer peripheral surface of the shaft 9b screws together with the thread groove formed in the inner peripheral surface of the through hole 5d1. When the head 9a of the aiming screw 9 is operated and rotated by the specific tool, a position where the shaft 9b in the joint 5d screw together is changed, to thereby displace the joint 5d in the front and rear directions.

Figure 10A:
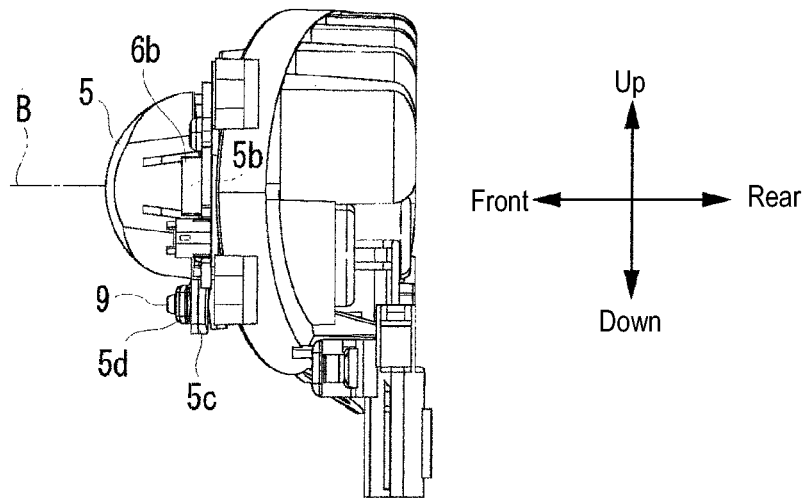
FIGS. 10A-10C are side views illustrating how an aiming mechanism provided in the fog lamp of FIG. 1 operates.
Figure 10B:
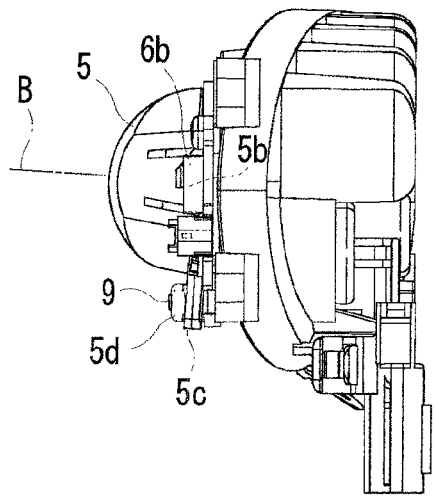
Figure 10C:
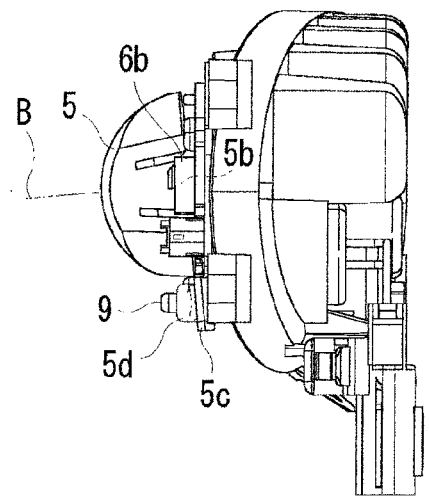

FIGS. 10A-10C are side views from the left, for explaining how the projection lens 5 moves in association with rotation of the aiming screw 9. FIG. 10A illustrates an initial state.

When the aiming screw 9 is rotated to move forward in this state, the joint 5d is displaced forward. In association with this displacement, the coupling portion 5c of the projection lens 5 is pushed forward. At this time, the right pivot shaft 5a and the left pivot shaft 5b of the projection lens 5 rotate clockwise (when viewed from the left) in the right shaft bearing 6a and the left shaft bearing 6b of the lens holder 6. The optical axis B of the projection lens 5 is accordingly tilted upward as shown in FIG. 10B.

On the other hand, when the aiming screw 9 is rotated to move rearward, the joint 5d is displaced rearward. In association with the displacement, the coupling portion 5c of the projection lens 5 is pulled back rearward. At this time, the right pivot shaft 5a and the left pivot shaft 5b of the projection lens 5 rotate counterclockwise (when viewed from the left) in the right shaft bearing 6a and the left shaft bearing 6b of the lens holder 6. The optical axis B of the projection lens 5 is accordingly tilted downward as shown in FIG. 10C.

That is, the aiming screw 9 and the joint 5d constitute an aiming mechanism to rotate the projection lens 5 about the right pivot shaft 5a and the left pivot shaft 5b with respect to the lens holder 6. When the head 9a of the aiming screw 9 is operated and rotated, the shaft 9b is rotated, and the joint 5d converts the rotation of the shaft 9b into a force to rotate the projection lens 5. Thereby, a reference position, in the up and down directions, of the optical axis B of the projection lens 5 can be adjusted by the rotation operation of the aiming screw 9.

With the above-described configuration, the reference position of the optical axis B of the projection lens 5 can be adjusted by directly rotating the projection lens 5, which is held by the lens holder 6. Accordingly, the demands to reduce the size of the fog lamp, which is an example of a vehicle lighting device, is met while the projection lens 5 and the aiming mechanism to adjust the optical axis of the projection lens are provided.

As shown in FIG. 4, the drive circuit board 7d provided with the light source drive circuit is disposed so that the main surface 7d1 faces the aiming screw 9 which is a part of the aiming mechanism.

With this configuration, a space required to provide the aiming screw 9 can be efficiently utilized, while an increase in size of the housing 2 can be suppressed. Therefore, the demand to reduce the size of the fog lamp, which is an example of a vehicle lighting device, is met while the projection lens 5 and the aiming mechanism to adjust the optical axis thereof can be provided.

It is noted that the aiming mechanism does not necessarily have an aiming screw that can be operated from outside the housing 2. For example, an actuator, coupled to the projection lens 5, may be provided in the lamp chamber 4, and the projection lens 5 may be rotated with respect to the lens holder 6 by the actuator. In this case, signals to control the actuator may be input through the wiring unit 8.

Figure 11:
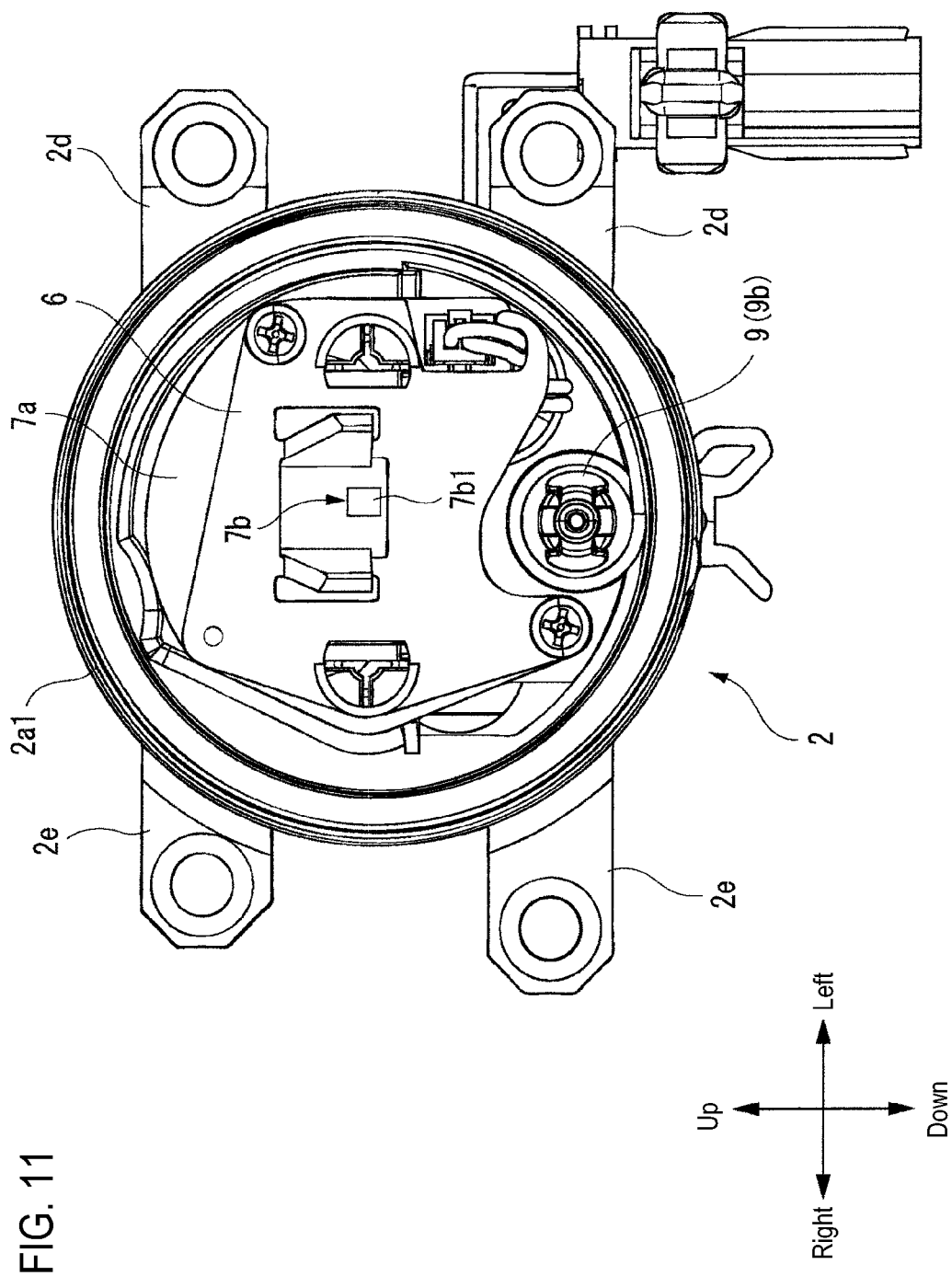
FIG. 11 is a front view partially illustrating the fog lamp of FIG. 1.

FIG. 11 is a front view of a portion of the fog lamp 1 in the state shown in FIG. 3, when the fog lamp 1 is viewed along the normal direction N1 of the light emitting surface 7b1 of the light source 7b. The housing 2 includes a contour portion having a circular shape when viewed along the normal direction N1.

As shown in FIG. 7, a through hole 2g of the housing 2 is exposed in a state in which the sealing member 8g of the wiring unit 8 is removed. The through hole 2g constitutes a passage to allow the first connection wire 8e to pass therethrough. The first connection wire 8e which is an example of a power supply line supplies power to the light source drive circuit of the drive circuit board 7d. The aiming screw 9 extends to pass through the housing 2 between the above-described through hole 2g and the ventilation portion 2f.

The housing 2 includes the contour portion having the circular shape when viewed along the normal direction N1 of the light emitting surface 7b1 of the light source 7b. Therefore, the projected area of the fog lamp 1 on a plane including the right and left directions and the up and down directions of the fog lamp 1 can be made small. In the case where the housing 2 has such a shape, it is relatively easy to ensure a space, in which components are disposed, near a central portion thereof in the right and left directions. The aiming screw 9 having a relatively large dimension is disposed between the through hole 2g and the ventilation portion 2f, which have relatively small dimensions. Thereby, the aiming screw 9 can be effectively disposed near the central portion of the housing 2 in the right and left directions. Accordingly, the demand to reduce the size of the fog lamp, which is an example of a vehicle lighting device, is met while the projection lens 5 and the aiming mechanism to adjust the optical axis thereof can be provided.

The above exemplary embodiment is described for the purpose of facilitating understanding of the invention. The invention is, however, not limited thereto. Obviously, the invention may be modified and improved so long as the modifications and improvements do not depart from the spirit thereof, and such equivalents are encompassed within the invention.

In the above exemplary embodiment, the normal direction N1 of the light emitting surface 7b1 of the light source 7b is orthogonal to the normal direction N2 of the main surface 7d1 of the drive circuit board 7d. However, the normal direction N1 and the normal direction N2 are not necessarily orthogonal to each other so long as the directions N1 and N2 intersect each other.

In the above exemplary embodiment, the main surface 7d1 of the drive circuit board 7d provided with the light source drive circuit is disposed so as to face downward in the fog lamp 1. However, the orientation of the main surface 7d1 may be set as appropriate so long as the normal direction N1 of the light emitting surface 7b1 intersects the normal direction N2 of the main surface 7d1. The main surface 7d1 of the drive circuit board 7d may be disposed to face upward, toward the left, or toward the right of the fog lamp 1.

In the above exemplary embodiment, the light emitting surface 7b1 of the light source 7b is disposed to face the projection lens 5. With this configuration, a distance between the light source 7b and the projection lens 5 is short. However, the orientation of the light emitting surface 7b1 of the light source 7b may be set as appropriate according to specifications of the fog lamp 1, so long as the normal direction N1 of the light emitting surface 7b1 intersects the normal direction N2 of the main surface 7d1 of the drive circuit board 7d.

In the above exemplary embodiment, the right pivot shaft 5a and the left pivot shaft 5b are provided in the projection lens 5, and the right shaft bearing 6a and the left shaft bearing 6b are provided in the lens holder 6. Conversely, the lens holder 6 may include a right pivot shaft and a left pivot shaft, and the projection lens 5 may include a right shaft bearing and a left shaft bearing.

In the above exemplary embodiment, as shown in FIG. 8, the joint 5d is formed to be separate from the projection lens 5, and is attached to the coupling portion 5c. However, the joint 5d may be integrally molded as a part of the projection lens 5. With this configuration, the number of components can be reduced. In the case where the coupling portion 5c and the joint 5d are provided to be separatable from each other as in the exemplary embodiment, it is facilitated to mold the individual members.

In the above exemplary embodiment, the housing 2 includes the pair of left attachment portions 2d and the pair of right attachment portions 2e. However, the positions, dimensions, and number of the left attachment portions 2d and the right attachment portions 2e may be set as appropriate according to the specifications of the vehicle to which the fog lamp 1 is fixed.

In the above exemplary embodiment, the fog lamp 1 is given as an example of a lighting device. However, the invention may be applied to various lighting devices each having a projection lens in a lamp chamber defined by a housing and a transparent cover, each lighting device requiring adjustment of the optical axis of the projection lens.

What is claimed is:

1. A vehicle lighting device configured to be disposed on a vehicle, comprising:
a support board;
a light source that is disposed on a front surface of the support board and that comprises a light emitting surface;
a projection lens that faces the light emitting surface and that is disposed so that at least a part of light emitted from the light source passes through the projection lens;
a drive circuit board that is disposed directly behind the support board and that comprises a circuit to control switching of the light source on and off; and
a housing that supports the light source and the drive circuit board and that defines a part of a lamp chamber which houses the projection lens,
wherein a first direction that is a normal direction to the light emitting surface intersects a second direction that is a normal direction to a main surface of the drive circuit board, and
wherein the second direction is an up and down direction of the vehicle.

2. The lighting device of claim 1, wherein the first direction is orthogonal to the second direction.

3. The lighting device of claim 1, wherein
the housing is a single metal member that is integrally molded with a plurality of radiator plates, and
the housing is formed with a ventilation portion that is in communication with the lamp chamber.

4. The lighting device of claim 1, further comprising:
a ventilation cap, wherein
the housing is formed with a ventilation portion that is in communication with the lamp chamber and that defines an airflow passage opening to an opposite side of the housing to the lamp chamber, and
the ventilation cap covers the ventilation portion.

5. The lighting device of claim 1, further comprising:
a holder that holds the projection lens, a position of the holder being fixed with respect to the light source;
a pivot shaft that is provided in one of the projection lens and the holder and that extends in a direction intersecting the optical axis of the projection lens;
a shaft bearing that is provided in the other of the projection lens and the holder and that holds the pivot shaft; and
an aiming mechanism that rotates the projection lens about the pivot shaft with respect to the holder.

6. The lighting device of claim 5, wherein
the aiming mechanism comprises
a screw including a portion that can be operated at an outside of the housing so as to rotate, and
a joint that converts rotation of the screw into a force to rotate the projection lens about the pivot shaft,
the screw extends to pass through a portion of the housing, and
the main surface of the drive circuit board faces a portion of the screw.

7. The lighting device of claim 6, wherein the joint is integrated with the projection lens.

8. The lighting device of claim 6, wherein
the housing includes a contour portion having a circular shape when viewed along the first direction,
a passage and a ventilation portion are formed in the housing,
a power supply line to supply power to the circuit passes through the passage,
the ventilation portion is in communication with the lamp chamber, and
the screw extends to pass through the housing between the passage and the ventilation portion.

9. A vehicle lighting device comprising:
a support board;
a light source that is disposed on a front surface of the support board and that comprises a light emitting surface;
a projection lens that faces the light emitting surface and that is disposed so that at least a part of light emitted from the light source passes through the projection lens;
a drive circuit board that is disposed directly behind the support board and that comprises a circuit to control switching of the light source on and off; and
a housing that supports the light source and the drive circuit board and that defines a part of a lamp chamber which houses the projection lens,
wherein a first direction that is a normal direction to the light emitting surface intersects a second direction that is a normal direction to a main surface of the drive circuit board,
wherein the housing includes an attachment portion to which a transparent cover is attached, the transparent cover and the housing defining the lamp chamber, and
wherein the attachment portion comprises an oblique surface that obliquely cuts across the main surface of the drive circuit board when viewed along the second direction.

* * * * *